United States Patent
Matsumoto et al.

(10) Patent No.: US 9,758,664 B2
(45) Date of Patent: Sep. 12, 2017

(54) AUTOMOTIVE INTERIOR PARTS

(71) Applicant: ASAHI KASEI KABUSHIKI KAISHA, Tokyo (JP)

(72) Inventors: Tatsuya Matsumoto, Tokyo (JP); Tomoyuki Fujisawa, Tokyo (JP); Ryoko Hirashima, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/035,606

(22) PCT Filed: Nov. 5, 2014

(86) PCT No.: PCT/JP2014/079365
§ 371 (c)(1),
(2) Date: May 10, 2016

(87) PCT Pub. No.: WO2015/068739
PCT Pub. Date: May 14, 2015

(65) Prior Publication Data
US 2016/0264770 A1    Sep. 15, 2016

(30) Foreign Application Priority Data
Nov. 11, 2013   (JP) ................. 2013-233402

(51) Int. Cl.
C08L 33/12 (2006.01)
C08L 51/04 (2006.01)
C08F 279/04 (2006.01)
C08L 55/02 (2006.01)

(52) U.S. Cl.
CPC ............ *C08L 33/12* (2013.01); *C08F 279/04* (2013.01); *C08L 55/02* (2013.01); *C08L 2205/03* (2013.01)

(58) Field of Classification Search
None
See application file for complete search history.

(56) References Cited

U.S. PATENT DOCUMENTS

| 5,760,120 A | 6/1998 | Itoh et al. |
| 6,599,978 B1 | 7/2003 | Shikisai et al. |
| 2014/0186565 A1 | 7/2014 | Fujisawa et al. |

FOREIGN PATENT DOCUMENTS

| EP | 2048197 A1 | 4/2009 |
| EP | 2623289 A1 | 8/2013 |
| JP | 8-134296 A | 5/1996 |
| JP | 3024495 B2 | 3/2000 |
| JP | 2002-322222 A | 11/2002 |
| JP | 2003-165888 A | 6/2003 |
| JP | 3428130 B2 | 7/2003 |
| JP | 3590111 B2 | 11/2004 |
| JP | 3682229 B2 | 8/2005 |
| JP | 2005-298776 A | 10/2005 |
| JP | 2009-067970 A | 4/2009 |
| KR | 10-0467780 B1 | 1/2005 |

OTHER PUBLICATIONS

European Search Report for European Application No. 14860494.5, dated Oct. 26, 2016.
International Search Report (PCT/ISA/210) issued in PCT/JP2014/079365, mailed on Feb. 17, 2015.
Written Opinion (PCT/ISA/237) issued in PCT/JP2014/079365, mailed on Feb. 17, 2015.

*Primary Examiner* — Jeffrey Mullis
(74) *Attorney, Agent, or Firm* — Birch, Stewart, Kolasch & Birch, LLP

(57) ABSTRACT

An automotive interior part includes a thermoplastic resin composition containing a prescribed acetone insoluble fraction (A) and a prescribed acetone soluble fraction (B), in which a content of the acetone insoluble fraction (A) is 5 to 18% by mass based on 100% by mass of a sum of the acetone insoluble fraction (A) and the acetone soluble fraction (B).

5 Claims, No Drawings

AUTOMOTIVE INTERIOR PARTS

TECHNICAL FIELD

The present invention relates to automotive interior parts.

BACKGROUND ART

An acrylonitrile-butadiene-styrene copolymer (ABS resin) is a well-balanced resin excellent in flow properties, impact resistance, chemical resistance and surface appearance, and therefore, has been used in various fields including vehicle components, and housings of OA equipment, home appliances and toys.

Recently, instead of a coating for a home appliance such as a housing of a TV and a product such as OA equipment and a toy, there has been a demand for a material that has performances such as impact resistance and good appearance even when not coated. As such a material, a resin obtained by coloring, in jet-black, an alloy of an ABS resin and PMMA has been proposed (see, for example, Patent Literature 1).

Besides, if automotive interior parts or the like is used in a non-coated state, a material having surface appearances such as deep jet-blackness, and scratch resistance as well as high heat resistance is required. In this regard, the alloy described in Patent Literature 1 cannot exhibit high heat resistance although the jet-blackness and the scratch resistance can be attained, and hence is difficult to develop into automotive interior parts.

Therefore, a heat-resistant transparent resin composition excellent in heat resistance, impact resistance and transparency has been proposed to be used for automotive interior parts (see, for example, Patent Literature 2).

CITATION LIST

Patent Literature

Patent Literature 1: Japanese Patent Laid-Open No. 2009-067970
Patent Literature 2: Japanese Patent Laid-Open No. 2005-298776

SUMMARY OF INVENTION

Technical Problem

If the heat-resistant transparent resin composition described in Patent Literature 2 is used for producing a jet-black molded product, however, the following problem arises: white haze (irregularities in color or cloud) and silver streaks are caused on the surface of the molded product due to change of a molding temperature or a molding pressure. Besides, in consideration of description, given in Examples and Comparative Examples of Patent Literature 2, of particle sizes and the like of a methacrylate-based resin corresponding to a factor of the silver streaks (scratch resistance) and a rubber-modified thermoplastic resin corresponding to a factor of the white haze, a resin composition capable of overcoming both the white haze and the silver streaks caused by the change of a molding temperature or a molding pressure is not mentioned.

Accordingly, the present invention was accomplished in consideration of the above-described problem, and an object is to provide automotive interior parts that exhibits jet-blackness, scratch resistance, heat resistance and impact resistance, and has stable and beautiful appearance free from silver streaks and white haze.

Solution to Problem

The present inventors made earnest studies for solving the above-described problem, resulting in finding that the above-described problem can be solved by using a prescribed thermoplastic resin composition, and thus, the present invention was completed.

Specifically, the present invention provides:

[1]

An automotive interior parts, comprising a thermoplastic resin composition comprising an acetone insoluble fraction (A) and an acetone soluble fraction (B), wherein a content of the acetone insoluble fraction (A) is 5 to 18% by mass based on 100% by mass of a sum of the acetone insoluble fraction (A) and the acetone soluble fraction (B), the acetone insoluble fraction (A) comprises one, two or more resins having different constitutional units, the constitutional units of all the resins comprised in the acetone insoluble fraction (A) comprise at least a rubber component unit having a mass average particle size of 0.1 to 0.35 μm, an aromatic vinyl monomer unit and an unsaturated nitrile monomer unit, the acetone insoluble fraction (A) comprises a graft copolymer in which at least the unsaturated nitrile monomer unit is grafted onto the rubber component unit, a content of the unsaturated nitrile monomer unit comprised in the graft copolymer is 15 to 28% by mass based on 100% by mass of all grafted constitutional units, the acetone soluble fraction (B) comprises one, two or more resins having different constitutional units, and the constitutional units of all the resins comprised in the acetone soluble fraction (B) comprise at least an aromatic vinyl monomer unit, an unsaturated nitrile monomer unit, a methacrylate monomer unit and a maleimide-based monomer unit, and a content of the methacrylate monomer unit is 45 to 60% by mass based on 100% by mass of the constitutional units of all the resins comprised in the acetone soluble fraction (B).

[2]

The automotive interior parts according to the above [1], wherein a Vicat softening point according to ISO 306 of the thermoplastic resin composition is 105 to 120° C.

[3]

The automotive interior parts according to the above [1] or [2], wherein a content of the maleimide-based monomer unit is 5 to 13% by mass based on 100% by mass of the thermoplastic resin composition.

[4]

The automotive interior parts according to any one of the above [1] to [3], wherein the rubber component unit comprises a diene-based rubber unit.

[5]

The automotive interior parts according to any one of the above [1] to [4], wherein a content of the rubber component unit is 30 to 60% by mass based on 100% by mass of the constitutional units of all the resins comprised in the acetone insoluble fraction (A).

Advantageous Effects of Invention

The present invention can provide automotive interior parts that exhibits jet-blackness, scratch resistance, heat resistance and impact resistance, and has stable and beautiful appearance free from silver streaks and white haze.

BRIEF DESCRIPTION OF EMBODIMENT

An embodiment for practicing the present invention (hereinafter referred to as the "present embodiment") will now be described, and it is noted that the present invention is not limited to the embodiment but can be variously modified without departing from the scope of the present invention. Incidentally, the term "monomer" refers to a polymerizable molecule before forming a resin, and the term "monomer unit" or "unit" refers to a unit corresponding to a prescribed monomer and constituting a resin.

[Automotive Interior Parts]

An automotive interior parts of the present embodiment comprises a thermoplastic resin composition comprising an acetone insoluble fraction (A) and an acetone soluble fraction (B), in which a content of the acetone insoluble fraction (A) is 5 to 18% by mass based on 100% by mass of a sum of the acetone insoluble fraction (A) and the acetone soluble fraction (B); the acetone insoluble fraction (A) comprises one, two or more resins having different constitutional units, and the constitutional units of all the resins comprised in the acetone insoluble fraction (A) comprise at least a rubber component unit having a mass average particle size of 0.1 to 0.35 µm, an aromatic vinyl monomer unit and an unsaturated nitrile monomer unit; the acetone insoluble fraction (A) comprises a graft copolymer in which at least the unsaturated nitrile monomer unit is grafted onto the rubber component unit; a content of the unsaturated nitrile monomer unit comprised in the graft copolymer is 15 to 28% by mass based on 100% by mass of all grafted constitutional units; the acetone soluble fraction (B) comprises one, two or more resins having different constitutional units, and the constitutional units of all the resins comprised in the acetone soluble fraction (B) comprise at least an aromatic vinyl monomer unit, an unsaturated nitrile monomer unit, a methacrylate monomer unit and a maleimide-based monomer unit; and a content of the methacrylate monomer unit is 45 to 60% by mass based on 100% by mass of the constitutional units of all the resins comprised in the acetone soluble fraction (B).

[Acetone Insoluble Fraction (A)]

The thermoplastic resin composition of the present embodiment contains the acetone insoluble fraction (A). The acetone insoluble fraction (A) contains one, two or more resins having different constitutional units, and the constitutional units of all the resins contained in the acetone insoluble fraction (A) include at least a rubber component unit having a mass average particle size of 0.1 to 0.35 µm, an aromatic vinyl monomer unit and an unsaturated nitrile monomer unit.

Here, the term "acetone insoluble fraction (A)" refers to a component insoluble in acetone when the thermoplastic resin composition of the present embodiment is dissolved in acetone. The acetone insoluble fraction (A) can be specified by a method described in Examples below.

Besides, the term "constitutional units of all the resins comprised in the acetone insoluble fraction (A)" refers, if one resin is contained in the acetone insoluble fraction (A), to all constitutional units constituting the resin, and if two or more resins are contained in the acetone insoluble fraction (A), to all constitutional units constituting the respective resins. In other words, resins contained in the acetone insoluble fraction (A) are not especially limited, and examples thereof include a combination of a resin containing the rubber component unit, a resin containing the aromatic vinyl monomer unit and a resin containing the unsaturated nitrile monomer unit; a combination of a resin containing the rubber component unit and the aromatic vinyl monomer unit and a resin containing the unsaturated nitrile monomer unit; a combination of a resin containing the rubber component unit and a resin containing the aromatic vinyl monomer unit and the unsaturated nitrile monomer unit; a combination of a resin containing the rubber component unit and a resin containing the unsaturated nitrile monomer unit with a resin containing the aromatic vinyl monomer unit; and single resins each containing the rubber component unit, the aromatic vinyl monomer unit or the unsaturated nitrile monomer unit.

The rubber component unit is not especially limited, and examples thereof include a (conjugated) diene-based rubber unit containing at least one selected from the group consisting of polybutadiene, a styrene-butadiene copolymer, an acrylonitrile-butadiene copolymer, an acrylonitrile-butadiene-styrene copolymer, polyisoprene, polychloroprene, a styrene-butadiene block copolymer, a styrene-isoprene block copolymer, an ethylene-propylene-diene terpolymer and the like; an acrylic rubber unit containing polybutyl acrylate or the like; an ethylene-propylene rubber unit; a silicone rubber unit; a silicone-acrylic composite rubber unit; and a rubber unit containing a hydrogenated product of any of these. Among these, a (conjugated) diene-based rubber unit is preferred, and polybutadiene, a styrene-butadiene copolymer, an acrylonitrile-butadiene copolymer, an acrylonitrile-butadiene-styrene copolymer and a styrene-butadiene block copolymer are more preferred. If a (conjugated) diene-based rubber unit is used, the impact resistance tends to be further improved. These rubber component units may be used singly or in combinations of two or more.

A polymer contained in the rubber component unit has a glass transition temperature of preferably 0° C. or less, more preferably −50° C. or less, and further preferably −70° C. or less. The glass transition temperature can be measured through DSC by the conventional method.

A mass average particle size of the rubber component unit is 0.1 to 0.35 µm, preferably 0.12 to 0.33 µm, and more preferably 0.15 to 0.3 µm. If the mass average particle size is 0.1 µm or more, the impact resistance is further improved. Besides, if it is 0.35 µm or less, the surface appearances such as jet-blackness are further improved, and white haze is further suppressed. The mass average particle size can be measured by a method described in the Examples below. Incidentally, the term "mass average particle size of the rubber component unit" refers to a size of the rubber component unit, and if a graft copolymer is used, a graft copolymer portion is excluded.

A content of the rubber component unit is, based on 100% by mass of the constitutional units of all the resins contained in the acetone insoluble fraction (A), preferably 30 to 60% by mass, more preferably 35 to 60% by mass, and further preferably 40 to 55% by mass. If the content of the rubber component unit falls in the above-described range, compatibility with the acetone soluble fraction (such as the impact resistance) becomes better. The content of the rubber unit can be measured by a method described in the Examples below.

The aromatic vinyl monomer unit is not especially limited, and examples thereof include a styrene unit, an α-methylstyrene unit, an o-methylstyrene unit, a p-methylstyrene unit, an o-ethylstyrene unit, a p-ethylstyrene unit, a p-t-butylstyrene unit and a vinyl naphthalene unit. Among these, a styrene unit and an α-methylstyrene unit are preferred.

These aromatic vinyl monomer units may be used singly or in combinations of two or more.

The unsaturated nitrile monomer unit is not especially limited, and examples thereof include an acrylonitrile unit, a methacrylonitrile unit and an ethacrylonitrile unit. Among these, an acrylonitrile unit is preferred. These unsaturated nitrile monomer units may be used singly or in combinations of two or more.

Another copolymerizable monomer unit is not especially limited, and examples thereof include an unsaturated carboxylic acid alkyl ester monomer unit; an N-substituted maleimide-based monomer unit such as a maleic anhydride unit, an N-phenylmaleimide unit or an N-methylmaleimide unit; and a glycidyl group-containing monomer unit such as a glycidyl methacrylate unit. These copolymerizable monomer units may be used singly or in combinations of two or more.

The unsaturated carboxylic acid alkyl ester monomer unit is not especially limited, and examples thereof include an acrylate compound unit or a methacrylate compound unit such as a butyl acrylate unit, an ethyl acrylate unit, a methyl acrylate unit or a methyl methacrylate unit; and an acrylic acid unit such as an acrylic acid unit or a methacrylic acid unit. A copolymerized component used in this case is not especially limited, and examples thereof include an aromatic vinyl-based monomer such as styrene or α-methylstyrene; and an unsaturated carboxylic acid alkyl ester monomer such as methyl acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, 2-hydroxyethyl (meth)acrylate, 3-hydroxypropyl (meth)acrylate, 2,3,4,5,6-pentahydroxyhexyl (meth)acrylate, or 2,3,4,5-tetrahydroxypentyl (meth)acrylate. These may be used singly or in combinations of two or more.

(Graft Copolymer)

The acetone insoluble fraction (A) contains a graft copolymer in which at least the unsaturated nitrile monomer unit is grafted onto the rubber component unit. Besides, the acetone insoluble fraction (A) preferably contains a graft copolymer in which at least the aromatic vinyl monomer unit is grafted onto the rubber component unit, and a graft copolymer in which the aromatic vinyl monomer unit and the unsaturated nitrile monomer unit are grafted onto the rubber component unit. A polymer to be grafted onto the rubber component unit may contain another monomer unit copolymerizable with the aromatic vinyl monomer and the unsaturated nitrile monomer. When such a graft copolymer is contained, the compatibility with the acetone soluble fraction (a matrix) tends to be enhanced to attain excellent impact resistance.

The polymer to be grafted is not especially limited, and examples thereof include an acrylonitrile-styrene copolymer, an acrylonitrile-α-methylstyrene copolymer, an acrylonitrile-styrene-butyl acrylate copolymer, an acrylonitrile-styrene-methyl methacrylate copolymer and an acrylonitrile-styrene-N-phenylmaleimide copolymer. Among these, an acrylonitrile-styrene copolymer, an acrylonitrile-styrene-butyl acrylate copolymer and an acrylonitrile-styrene-methyl methacrylate copolymer are preferred.

A content of the unsaturated nitrile monomer unit contained in the graft copolymer is 15 to 28% by mass, preferably 17 to 27% by mass, and more preferably 18 to 25% by mass based on 100% by mass of all grafted constitutional units. If the content of the unsaturated nitrile monomer unit is 15% by mass or more, the impact resistance tends to be further improved. Besides, if the content of the unsaturated nitrile monomer unit is 28% by mass or less, the surface appearances such as jet-blackness tend to be further improved. The content of the unsaturated nitrile monomer unit can be measured by a method described in the Examples below.

A method for preparing the graft copolymer is not especially limited, and examples thereof include emulsion polymerization, suspension polymerization, bulk polymerization, solution polymerization, and a combined method of any of these polymerization methods. A specific example includes an emulsion graft polymerization method in which a copolymer is graft-polymerized with a latex of a rubber component prepared by the emulsion polymerization. It is noted that any of continuous, batch and semi-batch methods can be employed.

A ratio (a graft ratio) of a copolymer grafted onto the rubber component unit, produced during the production process of the graft copolymer, is preferably 10 to 200% by mass, more preferably 20 to 170% by mass, and further preferably 30 to 100% by mass based on 100% by mass of the rubber component unit. The graft ratio can be defined as a mass ratio of a copolymer (a graft component) grafted onto the rubber component unit to 100% by mass of the graft copolymer. It is noted that the graft ratio can be measured by a method described in the Examples below.

A content of the graft copolymer is preferably 50 to 100% by mass, more preferably 70 to 100% by mass, and further preferably 80 to 100% by mass based on 100% by mass of the acetone insoluble fraction (A). If the content of the graft copolymer falls in the above-described range, the impact resistance tends to be further better.

A content of the acetone insoluble fraction (A) is 5 to 18% by mass, preferably 7 to 18% by mass, and more preferably 10 to 17% by mass based on 100% by mass of a sum of the acetone insoluble fraction (A) and the acetone soluble fraction (B). If the content of the acetone insoluble fraction (A) is 5% by mass or more, the impact resistance and a mold release property are further improved. Besides, if the content of the acetone insoluble fraction (A) is 18% by mass or less, the scratch resistance and the heat resistance are further improved. The content of the acetone insoluble fraction (A) can be measured by a method described in the Examples below.

[Acetone Soluble Fraction (B)]

The thermoplastic resin composition of the present embodiment contains the acetone soluble fraction (B). The acetone soluble fraction (B) contains one, two or more resins having different constitutional units, and the constitutional units of all the resins contained in the acetone soluble fraction (B) include at least an aromatic vinyl monomer unit, an unsaturated nitrile monomer unit, a methacrylate monomer unit, and a maleimide-based monomer unit.

Here, the term "acetone soluble fraction (B)" refers to a component soluble in acetone when the thermoplastic resin composition of the present embodiment is dissolved in acetone. The acetone soluble fraction (B) can be specified by a method described in the Examples below.

Besides, the term "constitutional units of all the resins comprised in the acetone soluble fraction (B)" refers, if one resin is contained in the acetone soluble fraction (B), to all constitutional units constituting the resin, and if two or more resins are contained in the acetone soluble fraction (B), to all the constitutional units constituting the respective resins. In other words, resins contained in the acetone soluble fraction (B) are not especially limited, and examples thereof include a combination of a resin containing the aromatic vinyl monomer unit, a resin containing the unsaturated nitrile monomer unit, a resin containing the methacrylate monomer unit and a resin containing the maleimide-based monomer unit; a combination of a resin containing the aromatic vinyl monomer unit and the unsaturated nitrile monomer unit, a resin containing the methacrylate monomer unit and a resin containing the maleimide-based monomer unit; a combination of a resin containing the aromatic vinyl monomer unit and the methacrylate monomer unit, a resin containing the unsaturated nitrile monomer unit and a resin containing the maleimide-based monomer unit; a combination of a resin containing the aromatic vinyl monomer unit and the maleimide-based monomer unit, a resin containing the unsaturated nitrile monomer unit and a resin containing the methacrylate monomer unit; a combination of a resin containing the aromatic vinyl monomer unit, a resin containing the unsaturated nitrile monomer unit and the methacrylate monomer unit, and a resin containing the maleimide-based monomer unit; a combination of a resin containing the aromatic vinyl monomer unit, a resin containing the unsaturated nitrile monomer unit and the maleimide-based monomer unit, and a resin containing the methacrylate monomer unit; a combination of a resin containing the aromatic vinyl monomer unit, the unsaturated nitrile monomer unit and the methacrylate monomer unit and a resin containing the maleimide-based monomer unit; a combination of a resin containing the aromatic vinyl monomer unit, the unsaturated nitrile monomer unit and the maleimide-based monomer unit, and a resin containing the methacrylate monomer unit; a combination of a resin containing the aromatic vinyl monomer unit, the methacrylate monomer unit and the maleimide-based monomer unit, and a resin containing the unsaturated nitrile monomer unit; a combination of a resin containing the aromatic vinyl monomer unit, and a resin containing the unsaturated nitrile monomer unit, the methacrylate monomer unit and the maleimide-based monomer unit; and single resins each containing the aromatic vinyl monomer unit, the unsaturated nitrile monomer unit, the methacrylate monomer unit or the maleimide-based monomer unit.

The resin contained in the acetone soluble fraction (B) is preferably a mixture of at least two or more copolymers. Besides, the two or more copolymers are preferably compatible with one another. Incidentally, it can be checked whether or not the two or more copolymers are compatible with one another depending on whether or not Tg can be defined as one.

The aromatic vinyl monomer unit is not especially limited, and examples thereof include a styrene unit, an α-methylstyrene unit, an o-methylstyrene unit, a p-methylstyrene unit, an o-ethylstyrene unit, a p-ethylstyrene unit, a p-t-butylstyrene unit and a vinyl naphthalene unit. Among these, a styrene unit and an α-methylstyrene unit are preferred. These aromatic vinyl monomer units may be used singly or in combinations of two or more.

The unsaturated nitrile monomer unit is not especially limited, and examples thereof include an acrylonitrile unit, a methacrylonitrile unit and an ethacrylonitrile unit. Among these, an acrylonitrile unit is preferred. These unsaturated nitrile monomer units may be used singly or in combinations of two or more.

The methacrylate monomer unit is not especially limited, and examples thereof include a butyl methacrylate unit, an ethyl methacrylate unit, a methyl methacrylate unit, a propyl methacrylate unit, an isopropyl methacrylate unit, a cyclohexyl methacrylate unit, a phenyl methacrylate unit, a (2-ethylhexyl) methacrylate unit, a (t-butylcyclohexyl) methacrylate unit, a benzyl methacrylate unit, and a (2,2,2-trifluoroethyl) methacrylate unit. Among these, a methyl methacrylate unit is preferred. These methacrylate monomer units can be used singly or in combinations of two or more.

A content of the methacrylate monomer unit is 45 to 60% by mass, preferably 52 to 58% by mass, and more preferably 53 to 57% by mass based on 100% by mass of the constitutional units of all the resins contained in the acetone soluble fraction (B). If the content of the methacrylate monomer unit is 45% by mass or more, pencil hardness and the scratch resistance are further improved. Besides, if the content of the methacrylate monomer unit is 60% by mass or less, the impact resistance and the mold release property in molding are further improved. The content of the methacrylate monomer unit can be measured by a method described in the Examples below.

The maleimide monomer unit is not especially limited, and examples thereof include a maleimide unit, an N-methylmaleimide unit, an N-ethylmaleimide unit, an N-cyclohexylmaleimide unit, an N-phenylmaleimide unit, an N-(o-chlorophenyl)maleimide unit, an N-(m-chlorophenyl)maleimide unit, and an N-(p-chlorophenyl)maleimide unit. Among these, an N-cyclohexylmaleimide unit and an N-phenylmaleimide unit are preferred. These maleimide-based monomer units may be used singly or in combinations of two or more.

A content of the maleimide monomer unit is preferably 2.5 to 15% by mass, more preferably 5.0 to 12.5% by mass, and further preferably 7.5 to 10% by mass based on 100% by mass of the constitutional units of all the resins contained in the acetone soluble fraction (B). If the content of the maleimide monomer unit is 2.5% by mass or more, heat resistance tends to be further improved. Besides, if the content of the maleimide monomer unit is 15% by mass or less, moldability tends to be further improved, the white haze tends to be further suppressed and the appearance tends to be further improved.

An example of another copolymerizable monomer unit includes an acrylate monomer unit. The acrylate monomer unit is not especially limited, and examples thereof include a butyl acrylate unit, an ethyl acrylate unit, a methyl acrylate unit, a propyl acrylate unit, an isopropyl acrylate unit, a cyclohexyl acrylate unit, a phenyl acrylate unit, a (2-ethylhexyl) acrylate unit, a (t-butylcyclohexyl) acrylate unit, a benzyl acrylate unit and a (2,2,2-trifluoroethyl) acrylate.

(Vinyl-Based Copolymer and Methacrylic-Based Copolymer)

A combination of resins contained in the acetone soluble fraction (B) is not especially limited, and for example, a combination of a vinyl-based copolymer containing the aromatic vinyl monomer unit, the unsaturated nitrile monomer unit and another monomer unit copolymerizable with these units, and a methacrylic-based copolymer containing the methacrylate monomer unit, the maleimide-based monomer unit and another monomer unit copolymerizable with these units is preferred. As for a resin contained in the acetone soluble fraction (B), one resin can be used singly, or two or more resins can be used together.

A content of the unsaturated nitrile monomer unit in the vinyl-based copolymer contained in the acetone soluble fraction (B) is preferably 15 to 28% by mass, more preferably 17 to 27% by mass, and further preferably 18 to 25% by mass. If the content of the unsaturated nitrile monomer unit is 15% by mass or more, the impact resistance tends to be further improved. Besides, if the content of the unsaturated nitrile monomer unit is 28% by mass or less, the compatibility with the methacrylic-based copolymer contained in the acetone soluble fraction (B) and the surface appearances such as jet-blackness tend to be further improved.

The vinyl-based copolymer contained in the acetone soluble fraction (B) is preferably prepared by radical polymerization. A method for preparing the vinyl-based copolymer is not especially limited, and examples thereof include a bulk polymerization method, a solution polymerization method, a suspension polymerization method, a bulk suspension polymerization method, and an emulsion polymerization method. Among these methods, the bulk polymerization method, the solution polymerization method and the bulk suspension polymerization method are preferred.

A weight average molecular weight of the vinyl-based copolymer is preferably 60,000 to 300,000, more preferably 80,000 to 200,000, and further preferably 80,000 to 150,000. If the weight average molecular weight of the vinyl-based copolymer falls in the above-described range, the impact resistance and the moldability tend to become further better.

A content of the methacrylate monomer unit in the methacrylic-based copolymer contained in the acetone soluble fraction (B) is preferably 75 to 97% by mass, more preferably 75 to 95% by mass, and further preferably 80 to 95% by mass. If the content of the methacrylate monomer unit is 75% by mass or more, the pencil hardness and the jet-blackness tend to be further improved. Besides, if the content of the methacrylate monomer unit is 97% by mass or less, the heat resistance tends to be further improved.

A content of the maleimide-based monomer unit in the methacrylic-based copolymer contained in the acetone soluble fraction (B) is preferably 3 to 25% by mass, more preferably 5 to 25% by mass, and further preferably 5 to 20% by mass. If the content of the maleimide-based monomer unit is 3% by mass or more, the heat resistance tends to be further improved. Besides, if the content of the maleimide-based monomer unit is 25% by mass or less, the compatibility with the vinyl-based copolymer contained in the acetone soluble fraction (B) and the appearance properties including the white haze tend to be further improved.

A method for preparing the methacrylic-based copolymer contained in the acetone soluble fraction (B) is not especially limited, and examples thereof include the bulk polymerization method, the solution polymerization method, the suspension polymerization method, a precipitation polymerization method, and the emulsion polymerization method. Among these, the bulk polymerization method, the solution polymerization method and the suspension polymerization method are preferred.

A weight average molecular weight of the methacrylic-based copolymer is preferably 60,000 to 300,000, more preferably 60,000 to 250,000, and further preferably 70,000 to 230,000. If the weight average molecular weight of the methacrylic-based copolymer falls in the above-described range, the impact resistance and the moldability tend to become better.

The weight average molecular weights of the vinyl-based copolymer and the methacrylic-based copolymer can be measured by a method described in the Examples below.

(Characteristics of Automotive Interior Parts)

In the automotive interior parts of the present embodiment, a Vicat softening point according to ISO 306 is preferably 105 to 120° C., more preferably 107 to 119° C., and further preferably 110 to 119° C. If the Vicat softening point is 105° C. or more, the heat resistance necessary for automotive interior parts tends to be satisfied. Besides, if the Vicat softening point is 120° C. or less, the moldability and the surface appearances such as the jet-blackness tend to be further improved, the white haze tends to be further suppressed, and the appearance properties tend to be further improved. The Vicat softening point can be measured by a method described in the Examples below.

A method for controlling the Vicat softening point to 105 to 120° C. is not especially limited, and examples thereof include a method in which a resin containing a maleimide-based monomer unit and having a glass transition temperature of 150° C. or more is added to the acetone soluble fraction (B). The glass transition temperature of the resin containing the maleimide-based monomer unit is preferably 150° C. or more, more preferably 165° C. or more, and further preferably 170° C. or more. The upper limit of the glass transition temperature is not especially limited, and is preferably 220° C. or less. If the glass transition temperature is 150° C. or more, a necessary amount of the resin containing the maleimide-based monomer unit to be used for controlling the Vicat softening point to the specified range can be reduced, and hence, degradation of the compatibility with the acetone insoluble fraction (A) and deterioration of the impact resistance, which are otherwise caused by an excessive amount of the resin containing the maleimide-based monomer unit to be used, tend to be further suppressed.

A content of the maleimide-based monomer unit is preferably 5 to 13% by mass, and more preferably 7 to 10% by mass based on 100% by mass of the thermoplastic resin composition. If the content of the maleimide-based monomer unit is 5% by mass or more, the heat resistance tends to be further improved. Besides, if the content of the maleimide-based monomer unit is 13% by mass or less, the moldability tends to be further improved, the white haze tends to be further suppressed, and the appearance tends to be further improved.

In the automotive interior parts of the present embodiment, brightness (L*) according to JIS 28722 is preferably 6.5 or less, more preferably 6.2 or less, and further preferably 6.1 or less. Smaller brightness (L*) means higher jet-blackness, and if the brightness (L*) falls in the above-described range, the jet-blackness tends to be further improved. The brightness (L*) can be measured by a method described in the Examples below.

A method for controlling the brightness (L*) to 6.5 or less is not especially limited, and examples thereof include a method in which the transparency of a resin contained in the thermoplastic resin composition is improved. As a method for improving the transparency of the thermoplastic resin composition, a method in which the vinyl-based copolymer and the methacrylic-based copolymer containable in the acetone soluble fraction (B) are made compatible with each other, and/or a method in which the mass average particle size of the rubber component unit of the acetone insoluble fraction (A) is controlled to a specified range can be employed.

For making the vinyl-based copolymer and the methacrylic-based copolymer containable in the acetone soluble fraction (B) compatible with each other, a method in which a ratio of the unsaturated nitrile monomer unit in the vinyl-based copolymer and a ratio of the maleimide-based monomer in the methacrylic-based copolymer are controlled can be employed.

Besides, as the mass average particle size of the rubber component unit is smaller, the transparency of the thermoplastic resin composition tends to be higher but the impact resistance tends to be lowered. Therefore, in the present embodiment, the target brightness is attained by controlling the mass average particle size of the rubber component unit to a prescribed range.

In the automotive interior parts of the present embodiment, the pencil hardness according to JIS K5400 is preferably HB or harder, and more preferably F or harder. If the pencil hardness is HB or harder, the scratch resistance attained in using the molded product in a vehicle cabin tends to be further improved. The pencil hardness can be measured by a method described in the Examples below.

In the present embodiment, a method for controlling the pencil hardness to HB or harder is not especially limited, and examples thereof include a method in which the content of the methacrylate monomer unit containable in the acetone soluble fraction (B) is controlled.

When the content of the methacrylate monomer unit containable in the acetone soluble fraction (B) is increased, the pencil hardness tends to be higher, but since the content of the maleimide-based monomer unit is reduced, the heat resistance tends to be lowered. As the contents of the rubber component and the acetone insoluble fraction (A) are smaller, the pencil hardness tends to be higher, but the impact resistance and the mold release property in molding tend to be lowered. Therefore, in the present embodiment, the target pencil hardness is attained by controlling these contents to specified ranges.

A mass decrease ratio at 260° C. of the thermoplastic resin composition of the present embodiment is preferably 1% or less, more preferably 0.9% or less, and further preferably 0.8% or less. If the mass decrease ratio at 260° C. is 1% or less, the white haze, a volatile gas and the like are suppressed, and hence the appearance properties tend to be further improved. A mass decrease ratio corresponds to a rate of a mass lost through a test. The "mass decrease ratio at 260° C." can be measured by a method described in the Examples below.

The thermoplastic resin composition of the present embodiment has an effect that the white haze is difficult to occur. The term "white haze" refers to a phenomenon, occurring in an injection molded product of jet-black or the like, that the whole or a part of the molded product looks hazy. The white haze tends to occur in, for example, a portion where the pressure or the temperature of a resin changes, and may occur also in the vicinity of a portion having a corner with a small thickness and a small radius of curvature, or in the vicinity of a gate or a flow end portion. It is presumed to be caused due to the orientation of a rubber component, the compatibility in a polymer alloy and the like. Since the resin pressure differs inside a molded product, a rubber component unit is present in the injection molded product in a spherical shape or an oval shape formed by elongating a spherical shape, and therefore, when seen from the surface of the molded product, light transmittance differs, which makes it look hazy. Besides, in using a polymer alloy, since the compatibility between resins differs depending on the resin temperature, the resin itself is hazed, and hence the molded product looks hazy. In a polymer mixture such as a polymer alloy, the compatibility is generally shown as a phase diagram (see, for example, Jitsuyo Polymer Alloy Sekkei (Practical Design of Polymer Alloy), 2.3 Soyosei to Souzu (Compatibility and Phase Diagram), published by Kogyo Chosakai Publishing Co., Ltd.).

Since a resin composition used in the thermoplastic resin composition of the present embodiment is of an LCST (Lower Critical Solution Temperature) type, there is a cloud point corresponding to a critical point. If this temperature is largely higher than a molding temperature, stable compatibility is attained, but if it is lower than or close to the molding temperature, the compatibility is unstable. In the present embodiment, the causes of these have been ascertained, resulting in finding that the white haze of a molded product can be improved by employing a combination of a prescribed rubber particle size and a resin composition having a high cloud point.

The thermoplastic resin composition of the present embodiment has an effect that the silver streaks is difficult to occur. The term "silver streaks" refers to a phenomenon in which the appearance is spoiled because glittering silver white streaks, comparatively short bubbles and the like are formed on a resin surface due to a water content, a volatile content, or a cracked gas contained in the resin, the air swallowed up by rotation of a screw or the like.

[Other Additives]

The thermoplastic resin composition of the present embodiment may contain a sliding agent. The sliding agent is used for purpose of giving lubricity to the surface of the automotive interior parts. A content of the sliding agent is preferably 0.05 to 2% by mass from the viewpoint of the jet-blackness and the impact resistance.

The sliding agent is not especially limited, and examples thereof include a lubricant of an aliphatic metal salt or the like, polyolefins, an polyester elastomer and a polyamide elastomer. Among these, the thermoplastic resin composition preferably includes at least one or more lubricants containing a fatty acid metal salt and an amide group or an ester group. If such a sliding agent is contained, the scratch resistance tends to be further improved.

The fatty acid metal salt is not especially limited, and examples thereof include a salt of a metal, containing one or more selected from sodium, magnesium, calcium, aluminum and zinc, and a fatty acid. Such a fatty acid metal salt is not especially limited, and specific examples thereof include sodium stearate, magnesium stearate, calcium stearate, aluminum (mono, di or tri)stearate, zinc stearate, sodium montanate, calcium montanate, calcium ricinoleate, and calcium laurate. Among these, sodium stearate, magnesium stearate, calcium stearate and zinc stearate are preferred, a stearic acid-based metal salt is more preferred, and calcium stearate is further preferred. If such a fatty acid metal salt is contained, the scratch resistance tends to be further improved.

The polyolefins are not especially limited, and examples thereof include a composition generated from at least one or more of ethylene, propylene, α-olefin and the like. It is noted that the polyolefins include a composition induced by using such a composition as a raw material. Such polyolefins are not especially limited, and specific examples thereof include polypropylene, an ethylene-propylene copolymer, (high density, low density, or linear low density) polyethylene, oxidized polyolefin, and graft-polymerized polyolefin. Among these, a polyolefin obtained by grafting an oxidized polyolefin wax and a styrene-based resin is preferred from the viewpoint of the scratch resistance, and a polypropylene wax, a polyethylene wax, an oxidized polypropylene wax, an oxidized polyethylene wax, acrylonitrile-styrene copolymer-grafted polypropylene, acrylonitrile-styrene copolymer-grafted polyethylene, styrene polymer-grafted polypropylene, and styrene polymer-grafted polyethylene are more preferred.

The polyester elastomer is not especially limited, and examples thereof include polyester obtained from a polycondensate of a dicarboxylic acid compound and a dihydroxy compound, a polycondensate of an oxycarboxylic acid compound, a ring-opening polycondensate of a lactone compound, or a polycondensate of a mixture of these components. Either of homopolyester or copolyester can be used.

The dicarboxylic acid compound is not especially limited, and examples thereof include aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid, and sodium 3-sulfoisophthalic acid; aliphatic dicarboxylic acids such as 1,4-cyclohexanedicarboxylic acid, 1,2-cyclohexanedicarboxylic acid, and dicyclohexyl-4,4-dicarboxylic acid; aliphatic dicarboxylic acids such as diphenyl ether dicarboxylic acid, diphenyl ethane dicarboxylic acid, succinic acid, oxalic acid, adipic acid, sebacic acid, and dodecanedicarboxylic acid; a mixture of any of these dicarboxylic acids; and alkyl-, alkoxy- or halogen-substituted products of these. Besides, these dicarboxylic acid compounds can be used in the form of an esterifiable derivative, such as a lower alcohol ester like a dimethyl ester. In the present embodiment, these dicarboxylic acid compounds can be used singly or in combinations of two or more. Among these, terephthalic acid, isophthalic acid, 1,4-cyclohexanedicarboxylic acid, sebacic acid, adipic acid and dodecanedicarboxylic acid are particularly suitably used from the viewpoint of polymerizability, a color tone and the impact resistance.

The dihydroxy compound is not especially limited, and examples thereof include ethylene glycol, propylene glycol, butanediol, neopentyl glycol, butenediol, hydroquinone, resorcin, dihydroxydiphenyl ether, cyclohexanediol, hydroquinone, resorcin, dihydroxydiphenyl ether, cyclohexanediol, 2,2-bis(4-hydroxyphenyl) propane and the like; and polyoxyalkylene glycol of these, and alkyl-, alkoxy- and halogen-substituted products of these. These dihydroxy compounds can be used singly or in combinations of two or more.

The oxycarboxylic acid compound is not especially limited, and examples thereof include oxybenzoic acid, oxynaphthoic acid, diphenylene oxycarboxylic acid and the like; and alkyl-, alkoxy- and halogen-substituted products of these. These oxycarboxylic acid compounds can be used singly or in combinations of two or more. Besides, for producing a polyester elastomer, a lactone compound such as ε-caprolactone can be used.

The polyamide elastomer is not especially limited, and examples thereof include amino carboxylic acid or lactam having 6 or more carbon atoms, and a nylon mn salt having m+n of 12 or more. A hard segment of the polyamide elastomer is not especially limited, and examples thereof include aminocarboxylic acids such as ω-aminocaproic acid, ω-aminoenan acid, ω-aminocaprylic acid, ω-aminobergon acid, ω-aminocapric acid, 11-aminoundecanoic acid, and 12-aminododecanoic acid; lactams such as caprolactam and laurolactam; and nylon salts such as nylon 6,6, nylon 6,10, nylon 6,12, nylon 11,6, nylon 11,10, nylon 12,6, nylon 11,12, nylon 12,10, and nylon 12,12.

Besides, a soft segment of the polyamide elastomer is not especially limited, and examples thereof include polyols such as polyethylene glycol, poly(1,2- or 1,3-propylene oxide) glycol, poly(tetramethylene oxide) glycol, poly(hexamethylene oxide) glycol, a block or random copolymer of ethylene oxide and propylene oxide, and a block or random copolymer of ethylene oxide and tetrahydrofuran. A number average molecular weight of such a soft segment is preferably $2.0 \times 10^2$ to $6.0 \times 10^3$, and more preferably $2.5 \times 10^2$ to $4.0 \times 10^3$. Incidentally, poly(alkylene oxide) glycol having both ends aminated or carboxylated may be used.

Among these sliding agents, a combination of a stearic acid-based metal salt and a wax is particularly preferably used from the viewpoint of the scratch resistance. If a sliding agent is added, an acid-modified or epoxy-modified resin may be mixed for purpose of improving the compatibility.

Besides, the thermoplastic resin composition of the present embodiment may contain, if necessary, additives such as a UV absorber and an antioxidant, such as a phosphite-based compound, a hindered phenol-based compound, a benzotriazole-based compound, a benzophenone-based compound, a benzoate-based compound or a cyanoacrylate-based compound; a lubricant and a plasticizer, such as a higher fatty acid, an acid ester-based compound, an acid amide-based compound or a higher alcohol; a mold releasing agent, such as montanic acid, a salt thereof, an ester thereof or a half ester thereof, stearyl alcohol, stearamide or an ethylene wax; a discoloration inhibitor, such as phosphite or hypophosphite; a nucleating agent; an antistatic agent, such as an amine-based compound, a sulfonic acid-based compound or a polyether-based compound; a phosphorus-based flame retardant, such as 1,3-phenylene bis(2,6-dimethylphenyl phosphate), tetraphenyl-m-phenylene bisphosphate, phenoxy phosphoryl or phenoxy phosphazene; and a halogen-based flame retardant. From the viewpoint of weather resistance, the content of each of these additives is preferably 0.05 to 1% by mass.

Besides, from the viewpoint of further improving the surface appearances, the thermoplastic resin composition of the present embodiment may contain a known coloring agent. The known coloring agent is not especially limited, and examples thereof include an inorganic pigment, an organic pigment, a metallic pigment and a dye. Among these coloring agents, those coloring the automotive interior parts white, black or red are preferably used because such a color gives particularly distinctive luxury sense to the design of the automotive interior parts.

The inorganic pigment is not especially limited, and examples thereof include titanium oxide, carbon black, titanium yellow, an iron oxide-based pigment, ultramarine blue, cobalt blue, chromium oxide, spinel green, a lead chromate-based pigment and a cadmium-based pigment.

The organic pigment is not especially limited, and examples thereof include an azo-based pigment such as an azo lake pigment, a benzimidazolone pigment, a diarylide pigment or a condensed azo pigment; a phthalocyanine-based pigment such as phthalocyanine blue or phthalocyanine green; and a condensed polycyclic pigment such as an isoindolinone pigment, a quinophthalone pigment, a quinacridone pigment, a perylene pigment, an anthraquinone pigment, a perinone pigment or dioxazine violet.

The metallic pigment is not especially limited, and examples thereof include an aluminum metallic pigment in the form of flakes, a spherical aluminum pigment used for improving weld appearance, a mica powder for a pearl metallic pigment, and one obtained by coating a polyhedral particle of an inorganic substance such as glass with a metal by plating or sputtering.

The dye is not especially limited, and examples thereof include a nitroso dye, a nitro dye, an azo dye, a stilbene azo dye, a ketoimine dye, a triphenylmethane dye, a xanthene dye, an acridine dye, a quinoline dye, a methine/polymethine dye, a thiazole dye, an indamine/indophenol dye, an azine dye, an oxazine dye, a thiazine dye, a sulfide dye, an aminoketone/oxyketone dye, an anthraquinone dye, an indigoid dye, and a phthalocyanine dye.

These coloring agents may be used singly or in combinations of two or more.

From the viewpoint of further improving the color tone, a content of such a coloring agent is preferably 0.05 to 2% by mass, and more preferably 0.1 to 1.5% by mass.

[Method for Preparing Thermoplastic Resin Composition]

A method for preparing the thermoplastic resin composition of the present embodiment is not especially limited, and examples thereof include a method in which raw materials are kneaded by using an extruder or the like. Kneading means is not especially limited, and examples thereof include mixers such as an open roll, an intensive mixer, an internal mixer, a Ko-kneader, a twin-rotor type continuous kneader, and an extruder. Among these, a single screw or twin screw extruder is generally used.

A method for supplying the raw materials of the thermoplastic resin composition to a melt-kneader is not especially limited, and for example, all the raw materials may be simultaneously supplied to one supply port, or the raw materials may be respectively supplied through different supply ports. Examples thereof include a method in which an extruder having two inlets is used so as to supply components corresponding to the acetone soluble fraction (B) through a main inlet disposed on a side of the base of a screw and to supply components corresponding to the acetone insoluble fraction (A) through a sub inlet disposed between the main inlet and a tip of the extruder for melt kneading. Besides, if all the raw materials are supplied through the same supply port, all the materials may be previously mixed and thereafter put in an extruder hopper for kneading.

A preferable melt kneading temperature differs depending on the Vicat softening point according to ISO 306. Specifically, in terms of a cylinder set temperature, a temperature higher than the Vicat softening point by 110 to 180° C. is preferred.

Besides, if an extruder is used, the cylinder set temperature is preferably set to 30 to 200° C. in a supply zone and to a temperature higher than the Vicat softening point by 110 to 180° C. in a kneading zone where the melt kneading is performed. If the temperature is thus set in two stages, the kneading can be smoothly performed, and the appearance properties of the surface of the automotive interior parts obtained thereafter become much better.

A melt kneading time is preferably about 0.5 to 5 minutes.

Besides, if the thermoplastic resin composition is prepared by extrusion, a volatile content of the resin composition is preferably 1500 ppm or less at the stage of the supply to an injection molding machine. A method for controlling the volatile content is not especially limited, and for example, the volatile content is preferably sucked, at a degree of pressure reduction of −100 to −800 hPa, through a vent hole provided between a center portion of a cylinder of the twin screw extruder and a tip of the extruder.

The extruded thermoplastic resin composition can be directly cut into pellets, or formed into a strand and then cut with a pelletizer into pellets. The pellets can be in a general shape of a cylinder, a prism, a sphere or the like, and a cylindrical shape is suitable.

[Method for Producing Automotive Interior Parts]

The automotive interior parts of the present embodiment contains the above-described thermoplastic resin composition. A method for producing the automotive interior parts is not especially limited, and examples thereof include injection compression molding, gas assisted molding using a nitrogen gas, a carbon dioxide gas or the like, and rapid heat cycle molding in which a mold temperature is increased. These methods can be employed in combination. The gas assisted molding, the rapid heat cycle molding, and a combination of the gas assisted molding and the rapid heat cycle molding are preferred.

Here, the term "gas assisted molding" refers to generally known injection molding using a nitrogen gas or a carbon dioxide gas. The gas assisted molding is not especially limited, and examples thereof include a method in which a resin is injected into a mold cavity and a pressurized gas is then injected into a molded product as described in Japanese Patent Publication No. 57-14968 or the like; a method in which a resin is injected into a mold cavity and a pressurized gas is then injected under pressure into a cavity corresponding to one side of a molded product as described in Japanese Patent No. 3819972 or the like; and a method in which molding is performed with a thermoplastic resin previously filled with a gas as described in Japanese Patent No. 3349070 or the like. Among these methods, the method in which a pressurized gas is injected under pressure into a cavity corresponding to one side of a molded product is preferred.

In the present embodiment, holding pressure for preventing sink marks and warpage is preferably performed in a gas assisted manner. If the holding pressure for preventing sink marks and warpage is performed in a gas assisted manner, burrs are difficult to occur even if the mold temperature is comparatively high, and a pressure holding time for preventing sink marks and warpage can be shortened.

As a mold for a molded product, a mold having been finished with a file of a grit size of #4000 or finer, and preferably #12000 or finer is preferably used. Arithmetic average surface roughness Ra of the surface of the mold is preferably 0.02 μm or less, and more preferably 0.01 μm or less. If a mold having such Ra is used, automotive interior parts having surface appearances of deep jet-blackness and the like tends to be obtained.

A method for controlling the surface of the mold to the above-described arithmetic average surface roughness Ra is not especially limited, and a method of polishing it with an ultrasonic polishing machine or through a manual operation by using a diamond file, a grindstone, a ceramic grindstone, a ruby grindstone, a GC grindstone or the like is employed.

Besides, a steel material of the mold to be used is preferably quenched and tempered steel of 40 HRC or harder, and further preferably of 50 HRC or harder. Instead of polishing the mold, a chromium-plated mold may be used, or a mold having been polished as described above and then plated with chromium may be used.

The mold temperature in the injection molding is preferably in the vicinity of the Vicat softening point according to ISO 306, more preferably in a range from a temperature lower than the Vicat softening point by 25° C. to a temperature higher than the Vicat softening point by 20° C., and further preferably in a range from a temperature lower than the Vicat softening point by 15° C. to a temperature higher than the Vicat softening point by 5° C. If the above-described mold temperature is employed, a transferring property onto a cavity surface is further improved, and hence, automotive interior parts excellent in deeper jet-blackness can be obtained.

In general, when a cavity surface temperature is increased, time necessary for cooling is longer, and hence, there arises a problem of a long molding cycle. Therefore, the rapid heat cycle molding method in which the cavity surface is heated/cooled in short time is preferably employed. Thus, improvement of distinctness and productivity can be both attained. A cooling speed of the surface of the molded product, which largely affects the distinctness of the molded product, is preferably 1 to 100° C./sec, more preferably 30 to 90° C./sec, and further preferably 40 to 80° C./sec. The cylinder set temperature in the injection molding is preferably a temperature higher, by 105 to 150° C., than the Vicat softening point according to ISO 306, and more preferably a temperature higher, by 110 to +140° C., than the Vicat softening point.

Alternatively, a molding method in which a mold including a steam pipe or a heating wire is used for increasing/decreasing the mold temperature, or a molding method using supercritical $CO_2$ may be suitably employed.

As for the resin (the above-described kneaded product) temperature in the injection molding, the molding is preferably performed at a temperature suitable to the resin to be molded. For example, if it is an ABS-based resin, rubber-modified polystyrene or a methyl methacrylate-based resin, the resin temperature is preferably 220 to 260° C., and if it is a resin containing polycarbonate, the resin temperature is preferably 260 to 300° C.

An injection speed is preferably 1 to 50 mm/s, and more preferably 3 to 30 mm/s.

Since the automotive interior parts of the present embodiment has deep jet-blackness, it is preferably used for a housing or the like of a non-coated product. Here, the term "automotive interior parts" refers to a visible design component used in the interior of a vehicle. Particularly, it is preferably a component belonging to a non-impact area not necessarily subjected to a head impact test. Specific examples of such a component include an indicator cover, a window finisher, a garnish, a molding, and various switches and covers. Besides, the thermoplastic resin composition can be used in different products. The different products are not especially limited, and are preferably, for example, household products, daily use products and the like, and in particular, it is preferably used as a member of a product visible to a customer and a dealer.

A material usable in a non-coated state in automotive interior parts is required to have not only the surface appearances such as jet-blackness, the scratch resistance and the impact resistance but also high heat resistance, and in addition, required to have stable and beautiful appearance properties free from silver streaks and white haze. These requirements were not found until use of a vehicle interior jet-black component in a non-coated state, and hence, it is difficult to obtain, by conventional techniques, an injection molded product having all these properties. An injection molded product obtained in the present embodiment, however, has these properties and hence can be suitably used in automotive interior parts.

A shape of the automotive interior parts is not especially limited, and examples thereof include a thin shape like a plate, a three-dimensionally thick shape, a polygonal shape having angular corners, and a shape having many curved surfaces. Besides, a size of the automotive interior parts is not also especially limited, and examples thereof include a small shape falling in a range of 10×10×10 mm, and a large shape falling in a range of 1,000×1,000×500 mm.

EXAMPLES

The present embodiment will now be more specifically described with reference to Examples, and it is noted that the present embodiment is not limited thereto.

(1) Method for Extracting Acetone Insoluble Fraction

The content of an acetone insoluble fraction contained in an injection molded product was checked by the following method. Two dry centrifuge tubes were prepared for each sample, and after cooling the centrifuge tubes in a desiccator for 15 minutes or more, the tubes were precisely weighed up to 0.1 mg by an electric balance. A sample of about 1 g cut out from the injection molded product was weighed into each centrifuge tube, and the resultant tube was precisely weighed up to 0.1 mg. About 20 mL of acetone was collected by a measuring cylinder and put into each centrifuge tube, and the resultant centrifuge tube was sealed with a silicone stopper and shaken by a shaker for 2 hours. After shaking, a portion of the sample adhering to the silicone stopper was dropped off into the centrifuge tube by using a small amount of acetone. The resultant two centrifuge tubes were set on a diagonal line in a rotor of a Hitachi high speed cooling centrifuge, and the centrifuge was operated for performing centrifugation at a rotational speed of 20000 rpm for 60 minutes.

After completing the centrifugation, each precipitation tube was taken out of the rotor, a supernatant was decanted. About 20 mL of acetone was collected by a measuring cylinder and put into each centrifuge tube, and the resultant centrifuge tube was sealed with a silicone stopper and then shaken by a shaker for 1 hour. An operation of decanting a supernatant thus obtained (after the shaking for 1 hour), and thereafter, putting about 20 mL of acetone thereto again and shaking the resultant for 1 hour was repeated once again, and then, the resultant was centrifuged at a rotational speed of 20000 rpm for 50 minutes.

After completing the centrifugation, each precipitation tube was taken out of the rotor, and a supernatant was decanted. Thereafter, an operation similar to the second decantation was carried out again.

After completing the centrifugation, about 20 mL of acetone was collected by a measuring cylinder and put into each centrifuge tube, and the resultant centrifuge tube was sealed with a silicone stopper and then centrifuged at a rotational speed of 20000 rpm for 30 minutes. After completing the centrifugation, each precipitation tube was taken out of the rotor, and a supernatant was decanted. The thus obtained precipitate was dried at 80° C. for 30 minutes, and then at 130° C. for 30 minutes, and thus, an acetone insoluble fraction was obtained.

(1-2) Method for Extracting Acetone Soluble Fraction

A supernatant decanted in the above-described method was collected, and an acetone component was removed therefrom by vaporization to obtain an acetone soluble fraction.

(1-3) Method for Measuring Content of Acetone Insoluble Fraction

After the drying, the resultant was cooled in a desiccator for 30 minutes or more. After sufficiently cooling, the resultant acetone insoluble fraction was precisely weighed up to 0.1 mg by an electric balance. The content (% by mass) of the acetone insoluble fraction based on 100% by mass of a sum of the acetone insoluble fraction (A) and the acetone soluble fraction (B) was calculated in accordance with the following expression:

Content (% by mass) of Acetone insoluble fraction=
[Amount (g) of acetone insoluble fraction/
Amount (g) of collected sample]×100

If the injection molded product contained an inorganic insoluble fraction, the content (% by mass) of the acetone insoluble fraction based on 100% by mass of the sum of the acetone insoluble fraction (A) and an acetone soluble fraction (B) was calculated in accordance with the following expression:

Acetone insoluble fraction (% by mass)=[(Acetone insoluble fraction containing inorganic insoluble fraction (% by mass)−Inorganic insoluble fraction (% by mass))/(100−Inorganic insoluble fraction (% by mass))]×100

Here, the term "inorganic insoluble fraction" refers to titanium, glass fiber, talc, calcium carbonate or the like used in, for example, a coloring pigment.

(2) Mass Average Particle Size of Rubber Component Unit

The acetone insoluble fraction (A) was extracted from the injection molded product, and an ultra-thin section of 60 nm±2 nm was cut out therefrom. The ultra-thin section was dyed with osmic acid, and the resultant was observed with a transparent electron microscope (TEM; manufactured by Hitachi High-Technologies Corporation, product name: H-600AB). The thus obtained TEM photograph was analyzed by using image analysis software (manufactured by Asahi Kasei Engineering Corporation, product name: A-Zo Kun), and thus, a mass average particle size of a rubber component unit was obtained.

(3) Content of Methacrylate Monomer Unit

The composition of the acetone soluble fraction (B) was analyzed by pyrolysis gas chromatography, so as to calculate a content of a methyl methacrylate unit based on 100% by mass of constitutional units of all resins contained in the acetone soluble fraction (B).

(4) Content of Unsaturated Nitrile Monomer Unit Contained in Graft Copolymer

The composition of the acetone insoluble fraction (A) was analyzed by using a Fourier transform infrared spectrometer (FT-IR; manufactured by Perkin Elmer Co., Ltd, product name: Spectrum One), so as to calculate a content of an unsaturated nitrile monomer unit contained in a graft copolymer based on 100% by mass of all grafted constitutional units.

(5) Graft Ratio (%)

A graft ratio (%) of a graft copolymer described below was obtained by analysis of an absorption peak obtained by using the Fourier transform infrared spectrometer (FT-IR).

(6) Reduced Viscosity (dl/g)

A reduced viscosity (dl/g) of a copolymer described below was measured by the following method.

A thermoplastic resin was dissolved in acetone, and the resultant was separated by a centrifuge into an acetone soluble fraction and an acetone insoluble fraction. A reduced specific viscosity of a component of the thermoplastic resin not grafted onto a rubber-like polymer (a non-grafted component) was obtained by measuring a flowing time taken by a solution obtained by dissolving 0.25 g of the acetone soluble fraction in 50 ml of 2-butanone to flow through a Cannon-Fenske type capillary at 30° C.

(7) Weight Average Molecular Weight (Mw) of Methacrylic-Based Copolymer

A weight average molecular weight (Mw) of a methacrylic-based copolymer was measured by gel permeation chromatography (GPC; manufactured by Tosoh Corporation, product name: HLC-8220GPC). As specific conditions, separation columns manufactured by Tosoh Corporation (three TSKgel-GMH$_{XL}$ columns) were used for performing the chromatography at a temperature of 38° C., by using tetrahydrofuran as a solvent, with a sample concentration set to 0.1 wt/v %, and a sampling pitch set to 1/0.4 (times/sec). A molecular weight of a separated component was calculated by creating a calibration curve, as a cubic regression curve, of the relationship between a molecular weight and an elution time of TSK standard polystyrene manufactured by the same company. A content of a specific molecular weight was calculated on the basis of an area ratio. A peak top molecular weight refers to a molecular weight corresponding to an elution time having a largest peak height.

(8) Jet-Blackness (Brightness (L*))

Brightness (L*) on a surface of an injection molded product was measured under geometric condition C (de: 8°) according to JIS Z8722. For measuring the brightness (L*), a spectrophotometer "CM-2002" (manufactured by Konica Minolta, Inc.) was used. As specific conditions, a light source D65 was used, luminous flux φ was set to 11 mm, and a view angle was set to 10°. A sample was not especially limited, and a comparatively smooth portion of the injection molded product was used.

(9) Heat Resistance (Vicat Softening Point)

Heat resistance was measured by using an injection molded product by a method B-120 according to ISO 306. A load was set to 50N, and a temperature increasing speed was set to 120° C./h. A sample had a size of about 20 to 30 mm (in width)×20 to 30 mm (in length)×2 to 4 mm (in thickness). If a sample had a thickness smaller than 2 mm, several samples stacked on one another may be used.

(10) Impact Resistance (Charpy Impact Value)

An injection molding machine (manufactured by Toshiba Machine Co., Ltd., product name: EC100S) was used to mold a multi-purpose test specimen type-A (ISO dumbbell test specimen) with a thickness of 4 mm in accordance with ISO 294 at a cylinder temperature of 250° C. and a mold temperature of 60° C., and the obtained test specimen was processed into a shape of 80 mm×10 mm×4 mm, and thereafter, the resultant specimen was notched with a prescribed size in accordance with ISO 179 and then subjected to a test. As a test value, an average of values obtained in five test specimens was used.

(11) Mass Decrease Ratio

A pellet was used for measuring a mass decrease ratio by TGA "MTC 1000SA" and "TG-DTA 2000SR" (manufactured by Bruker). Specifically, it was dried at 90° C. for 4 hours to remove a water content, and then, the temperature was increased at 100° C./min up to 260° C., and after standing still at 260° C. for 30 minutes, a mass was measured. A mass decrease ratio was calculated in accordance with the following expression assuming that a mass (m1) before the test was 100% and that a mass after the test was a mass (m2):

$$\text{Mass decrease ratio (\%)}=100-m2/m1\times100$$

It is noted that the temperature increasing speed and the like are not especially limited, and the temperature is preferably increased at 100° C./min.

(12) Scratch Resistance (Pencil Hardness)

An injection molded product was used for measuring the scratch resistance according to JIS K5400.

(13) Appearance Properties (White Haze)

An injection molded product was wholly visually checked. If there were no irregularities and cloud in color tone, it was evaluated as ○, if they could be recognized at a distance of 100 mm, it was evaluated as Δ, and if they could be recognized at a distance of 500 mm, it was evaluated as X.

(14) Appearance Properties (Silver Streaks)

The surface of an injection molded product was observed at 270° C. If no silver streaks was recognized, it was evaluated as ○, if it could be recognized at a distance of 100 mm, it was evaluated as Δ, and if it could be recognized at a distance of 500 mm, it was evaluated as X.

(1) Raw Materials Used

Preparation Example 1 of Graft Copolymer

A polymerization reaction vessel was charged with 110 parts by mass of a polybutadiene rubber latex (having a mass average particle size, measured by using a micro-track particle size analyzer "nanotrac 150" manufactured by Nikkiso Co., Ltd., of 0.25 μm, a solid content of 50% by mass, and a moisture index of 40%), 0.1 parts by mass of tertiary dodecyl mercaptan, and 25 parts by mass of deionized water, and after a gas phase portion was replaced with nitrogen, the temperature was increased to 55° C. Subsequently, while increasing the temperature up to 70° C. over 1.5 hours, a monomer mixture solution containing 12 parts by mass of acrylonitrile, 48 parts by mass of styrene, 0.5 parts by mass of tertiary dodecyl mercaptan and 0.15 parts by mass of cumene hydroperoxide, and an aqueous solution obtained by dissolving, in 22 parts by mass of deionized water, 0.2 parts by mass of sodium formaldehyde sulfoxylate, 0.004 parts by mass of ferrous sulfate and 0.04 parts by mass of disodium ethylenediaminetetraacetate were added thereto over 4 hours. After completing the addition, the polymerization reaction was completed while controlling the polymerization reaction vessel at 70° C. for 1 hour.

To the thus obtained ABS latex, an antifoaming agent made of a silicone resin (manufactured by Momentive Performance Materials Japan Inc., product name: TSA737, the same shall apply hereinafter) and a phenol-based antioxidant emulsion (manufactured by Chukyo Yushi Co., Ltd., product name: L-673, the same shall apply hereinafter) were added, and an aluminum sulfate aqueous solution was further added thereto to cause coagulation, and the resultant was sufficiently dehydrated, washed with water and then dried, and thus, a graft copolymer (A-1) was obtained. Here, a vinyl-based copolymer (B-1), that is, a thermoplastic resin, was simultaneously obtained. The graft copolymer (A-1) and the vinyl-based copolymer (B-1) were in a ratio of 74.9% by mass and 25.1% by mass. Results obtained by analyzing the graft copolymer (A-1) and the vinyl-based copolymer (B-1) are shown in Table 1.

Preparation Example 2 of Graft Copolymer

A polymerization reaction vessel was charged with 110 parts by mass of a polybutadiene rubber latex (having a mass average particle size, measured by using a micro-track particle size analyzer "nanotrac 150" manufactured by Nikkiso Co., Ltd., of 0.32 μm, a solid content of 50% by mass, and a moisture index of 40%), 0.1 parts by mass of tertiary dodecyl mercaptan, and 25 parts by mass of deionized water, and after a gas phase portion was replaced with nitrogen, the temperature was increased to 55° C. Subsequently, while increasing the temperature up to 70° C. over 1.5 hours, a monomer mixture solution containing 16.2 parts by mass of acrylonitrile, 43.8 parts by mass of styrene, 0.5 parts by mass of tertiary dodecyl mercaptan and 0.15 parts by mass of cumene hydroperoxide, and an aqueous solution obtained by dissolving, in 22 parts by mass of deionized water, 0.2 parts by mass of sodium formaldehyde sulfoxylate, 0.004 parts by mass of ferrous sulfate and 0.04 parts by mass of disodium ethylenediaminetetraacetate were added thereto over 4 hours. After completing the addition, the polymerization reaction was completed while controlling the polymerization reaction vessel at 70° C. for 1 hour.

To the thus obtained ABS latex, an antifoaming agent made of a silicone resin and a phenol-based antioxidant emulsion were added, and an aluminum sulfate aqueous solution was further added thereto to cause coagulation, and the resultant was sufficiently dehydrated, washed with water and then dried, and thus, a graft copolymer (A-2) was obtained. Here, a vinyl-based copolymer (B-2), that is, a thermoplastic resin, was simultaneously obtained. The graft copolymer (A-2) and the vinyl-based copolymer (B-2) were in a ratio of 75.0% by mass and 25.0% by mass. Results obtained by analyzing the graft copolymer (A-2) and the vinyl-based copolymer (B-2) are shown in Table 1.

Preparation Example 3 of Graft Copolymer

A polymerization reaction vessel was charged with 110 parts by mass of a polybutadiene rubber latex (having a mass average particle size, measured by using a micro-track particle size analyzer "nanotrac 150" manufactured by Nikkiso Co., Ltd., of 0.32 μm, a solid content of 50% by mass, and a moisture index of 40%), 0.1 parts by mass of tertiary dodecyl mercaptan, and 25 parts by mass of deionized water, and after a gas phase portion was replaced with nitrogen, the temperature was increased to 55° C. Subsequently, while increasing the temperature up to 70° C. over 1.5 hours, a monomer mixture solution containing 18 parts by mass of acrylonitrile, 42 parts by mass of styrene, 0.5 parts by mass of tertiary dodecyl mercaptan and 0.15 parts by mass of cumene hydroperoxide, and an aqueous solution obtained by dissolving, in 22 parts by mass of deionized water, 0.2 parts by mass of sodium formaldehyde sulfoxylate, 0.004 parts by mass of ferrous sulfate and 0.04 parts by mass of disodium ethylenediaminetetraacetate were added thereto over 4 hours. After completing the addition, the polymerization reaction was completed while controlling the polymerization reaction vessel at 70° C. for 1 hour.

To the thus obtained ABS latex, an antifoaming agent made of a silicone resin and a phenol-based antioxidant emulsion were added, and an aluminum sulfate aqueous solution was further added thereto to cause coagulation, and the resultant was sufficiently dehydrated, washed with water and then dried, and thus, a graft copolymer (A-3) was obtained. Here, a vinyl-based copolymer (B-3), that is, a thermoplastic resin, was simultaneously obtained. The graft copolymer (A-3) and the vinyl-based copolymer (B-3) were in a ratio of 75.0% by mass and 25.0% by mass. Results obtained by analyzing the graft copolymer (A-3) and the vinyl-based copolymer (B-3) are shown in Table 1.

Preparation Example 4 of Graft Copolymer

A polymerization reaction vessel was charged with 110 parts by mass of a polybutadiene rubber latex (having a mass average particle size, measured by using a micro-track particle size analyzer "nanotrac 150" manufactured by Nikkiso Co., Ltd., of 0.37 μm, a solid content of 50% by mass, and a moisture index of 40%), 0.1 parts by mass of tertiary dodecyl mercaptan, and 25 parts by mass of deionized water, and after a gas phase portion was replaced with nitrogen, the temperature was increased to 55° C. Subsequently, while increasing the temperature up to 70° C. over 1.5 hours, a monomer mixture solution containing 18 parts by mass of acrylonitrile, 42 parts by mass of styrene, 0.5 parts by mass of tertiary dodecyl mercaptan and 0.15 parts by mass of cumene hydroperoxide, and an aqueous solution obtained by dissolving, in 22 parts by mass of deionized water, 0.2 parts by mass of sodium formaldehyde sulfoxylate, 0.004 parts by mass of ferrous sulfate and 0.04 parts by mass of disodium ethylenediaminetetraacetate were added thereto over 4 hours. After completing the addition, the polymerization reaction was completed while controlling the polymerization reaction vessel at 70° C. for 1 hour.

To the thus obtained ABS latex, an antifoaming agent made of a silicone resin and a phenol-based antioxidant emulsion were added, and an aluminum sulfate aqueous solution was further added thereto to cause coagulation, and the resultant was sufficiently dehydrated, washed with water and then dried, and thus, a graft copolymer (A-4) was obtained. Here, a vinyl-based copolymer (B-4), that is, a thermoplastic resin, was simultaneously obtained. The graft copolymer (A-4) and the vinyl-based copolymer (B-4) were in a ratio of 74.9% by mass and 25.1% by mass. Results obtained by analyzing the graft copolymer (A-4) and the vinyl-based copolymer (B-4) are shown in Table 1.

Preparation Example 1 of Vinyl-Based Copolymer

A mixture of 13 parts by mass of acrylonitrile, 52 parts by mass of styrene, 35 parts by mass of toluene serving as a solvent, and 0.05 parts by mass of t-butylperoxy-2-ethylhexanoate serving as a polymerization initiator was bubbled with a nitrogen gas, and the resultant was then supplied, continuously at a speed of 37.5 kg/h, by using a spray nozzle into a reaction vessel having an internal volume of 150 L equipped with a two-stage inclined paddle type (having an inclination angle of 45 degrees) impeller similar to that described in Example 2 of Japanese Patent No. 3664576.

A polymerization temperature was set to 130° C., and a reaction liquid in the same amount as a supply liquid was continuously drawn out so that a filling rate of the reaction liquid in the reaction vessel could be retained at 70% by volume. A portion of the reaction vessel corresponding to a liquid phase portion was provided with a jacket for controlling the temperature, and the jacket temperature was set to 128° C.

The drawn reaction liquid was introduced into a volatile removal apparatus kept at 250° C. and a high vacuum of 10 mmHg, so as to collect an unreacted monomer and an organic solvent by degassing and to collect the generated vinyl-based copolymer (B-5) as a pellet. Results obtained by analyzing the vinyl-based copolymer (B-5) are shown in Table 1.

Preparation Example 2 of Vinyl-Based Copolymer

A vinyl-based copolymer (B-6) was prepared in the same manner as in Preparation Example 1 of Vinyl-based Copolymer except that 16 parts by mass of acrylonitrile, 49 parts by mass of styrene, 35 parts by mass of toluene serving as a solvent and 0.05 parts by mass of t-butylperoxy-2-ethylhexanoate serving as a polymerization initiator were used, and that the temperature of the temperature-controlling jacket was set to 129° C.

The drawn reaction liquid was introduced into a volatile removal apparatus kept at 250° C. and a high vacuum of 10 mmHg, so as to collect an unreacted monomer and an organic solvent by degassing and to collect the generated vinyl-based copolymer (B-6) as a pellet. Results obtained by analyzing the vinyl-based copolymer (B-6) are shown in Table 1.

Preparation Example 3 of Vinyl-Based Copolymer

A vinyl-based copolymer (B-7) was prepared in the same manner as in Preparation Example 1 of Vinyl-based Copolymer except that 21 parts by mass of acrylonitrile, 47 parts by mass of styrene, 32 parts by mass of toluene serving as a solvent and 0.05 parts by mass of t-butylperoxy-2-ethylhexanoate serving as a polymerization initiator were used, and that the temperature of the temperature-controlling jacket was set to 128° C.

The drawn reaction liquid was introduced into a volatile removal apparatus kept at 250° C. and a high vacuum of 10 mmHg, so as to collect an unreacted monomer and an organic solvent by degassing and to collect the generated vinyl-based copolymer (B-7) as a pellet. Results obtained by analyzing the vinyl-based copolymer (B-7) are shown in Table 1.

Preparation Example 1 of Methacrylic-Based Copolymer

A vessel having a stirrer equipped with four inclined paddle impeller s was charged with 2 kg of water, 65 g of tribasic calcium phosphate, 39 g of calcium carbonate and 0.39 g of sodium lauryl sulfate to obtain a mixed solution. Next, a 60-L reactor having a stirrer equipped with three backward swept impellers was charged with 26 kg of water, the temperature was increased to 80° C., and then, the reactor was charged with the mixed solution, 19,042 g of methyl methacrylate, 1,393 g of styrene, 2,787 g of N-phenylmaleimide, 40.64 g of lauroyl peroxide and 48.77 g of n-octyl mercaptan. The temperature was kept at about 75° C. for performing suspension polymerization, and an exothermic peak was observed about 120 minutes after introducing the raw materials. Thereafter, the temperature was increased to 93° C. at a speed of 1° C./min, the reaction solution was then aged for 120 minutes, and the polymerization reaction was substantially completed. Next, the temperature was lowered to 50° C., and 20% by mass of sulfuric acid was introduced to dissolve a suspension agent. Subsequently, after the polymerization reaction solution was allowed to pass through a 1.68 mm mesh sieve to remove aggregate, a water component was filtered out, the resultant slurry was dehydrated to obtain a bead-shaped polymer, the thus obtained bead-shaped polymer was washed with water, then dehydrated as described above, further washed by repeating washing with ion-exchanged water and dehydrating, and thus, a methacrylic-based copolymer (M-1) was obtained. The thus obtained methacrylic-based copolymer (M-1) was a methyl methacrylate-N-phenylmaleimide-styrene copolymer. Results obtained by analyzing the methacrylic-based copolymer (M-1) are shown in Table 1.

Preparation Example 2 of Methacrylic-Based Copolymer

A methacrylic-based copolymer (M-2) was prepared in the same manner as in Preparation Example 1 of Methacrylic-based Copolymer except that 18,578 g of methyl methacrylate, 1,161 g of styrene, 3,019 g of N-phenylmaleimide, 464 g of methyl acrylate, 40.32 g of lauroyl peroxide and 47.32 g of n-octyl mercaptan were used. The thus obtained methacrylic-based copolymer (M-2) was a methyl methacrylate-methyl acrylate-N-phenylmaleimide-styrene copolymer. Results obtained by analyzing the methacrylic-based copolymer (M-2) are shown in Table 1.

Preparation Example 3 of Methacrylic-Based Copolymer

A methacrylic-based copolymer (M-3) was prepared in the same manner as in Preparation Example 1 of Methacrylic-based Copolymer except that 1,523 g of methyl methacrylate, 284 g of styrene, 163 g of maleic anhydride, 0.99 g of lauroyl peroxide and 4.93 g of n-octyl mercaptan were used. The thus obtained methacrylic-based copolymer (M-3) was a methyl methacrylate-styrene-maleic anhydride copolymer. Results obtained by analyzing the methacrylic-based copolymer (M-3) are shown in Table 1.

Preparation Example 4 of Methacrylic-Based Copolymer

A methacrylic-based copolymer (M-4) was prepared in the same manner as in Preparation Example 1 of Methacrylic-based Copolymer except that 22,440 g of methyl methacrylate, 694 g of methyl acrylate, 46.27 g of lauroyl peroxide and 55.52 g of n-octyl mercaptan were used. The thus obtained methacrylic-based copolymer (M-4) was a methyl methacrylate-methyl acrylate copolymer. Results obtained by analyzing the methacrylic-based copolymer (M-4) are shown in Table 1.

Preparation Example 5 of Methacrylic-Based Copolymer

A methacrylic-based copolymer (M-5) was prepared in the same manner as in Preparation Example 1 of Methacrylic-based Copolymer except that 14,482 g of methyl methacrylate, 2,758 g of styrene, 5,747 g of N-phenylmaleimide, 34.48 g of lauroyl peroxide and 43.68 g of n-octyl mercaptan were used. The thus obtained methacrylic-based copolymer (M-5) was a methyl methacrylate-N-phenylmaleimide-styrene copolymer. Results obtained by analyzing the methacrylic-based copolymer (M-5) are shown in Table 1.

Example 1 of Alternative Coloring Agent

Mitsubishi carbon black #850 (X-1) (trade name) (carbon black manufactured by Mitsubishi Chemical Corporation, having a sublimation temperature of 3642° C.)

Example 1

Fifteen parts by mass of the graft copolymer (A-1), 5 parts by mass of the vinyl-based copolymer (B-1), 15 parts by mass of the vinyl-based copolymer (B-5), 5 parts by mass of the vinyl-based copolymer (B-6), 60 parts by mass of the methacrylic-based copolymer (M-1) and 0.5 parts by mass of the coloring agent (X-1) were mixed, the resultant mixture was introduced into a hopper of a twin screw extruder ("ZSK-25" manufactured by Coperion), and a pellet was produced at a cylinder set temperature of 250° C., a screw rotational speed of 200 rpm, and a discharge rate of 10 kg/hr. The thus produced pellet was subjected to injection molding ("EC100" manufactured by Toshiba Machine Co., Ltd.) at a resin temperature of 250° C., a mold temperature of 70° and an injection speed of 20 mm/s, and thus, an injection molded product in a plate shape of 50 mm×90 mm×2.5 mm was produced. Incidentally, for checking silver streaks, an injection molded product was produced in the same manner as in the production of the plate except that the resin temperature was set to 270° C.

Examples 2 to 6 and Comparative Examples 1 to 7

Pellets and injection molded products were obtained in the same manner as in Example 1 by employing compositions listed in Table 2.

TABLE 1

| Graft Copolymer | | | | |
|---|---|---|---|---|
| | A-1 | A-2 | A-3 | A-4 |
| Acrylonitrile (wt %) | 6.7 | 9 | 10 | 8.3 |
| Butadiene (wt %) | 66.8 | 66.7 | 66.7 | 66.8 |
| Styrene (wt %) | 26.5 | 24.3 | 23.3 | 24.9 |
| Graft Ratio (wt %) | 49.7 | 49.9 | 49.9 | 49.7 |
| Mass Average Particle Size of Rubber Component Unit | 0.25 | 0.32 | 0.32 | 0.37 |
| Content of Unsaturated Nitrile Monomer in Graft (wt %) | 20 | 27 | 30 | 25 |

| Vinyl-based Copolymer | | | | | | | |
|---|---|---|---|---|---|---|---|
| | B-1 | B-2 | B-3 | B-4 | B-5 | B-6 | B-7 |
| Acrylonitrile (wt %) | 20.1 | 27 | 30 | 25.1 | 20.8 | 24.8 | 29.8 |
| Styrene (wt %) | 79.9 | 73 | 70 | 74.9 | 79.2 | 75.2 | 70.2 |
| Reduced Viscosity (dl/g) | 0.33 | 0.34 | 0.33 | 0.33 | 0.67 | 0.46 | 0.65 |

| Methacrylic-based Copolymer | | | | | |
|---|---|---|---|---|---|
| | M-1 | M-2 | M-3 | M-4 | M-5 |
| Methyl Methacrylate (wt %) | 82 | 80 | 77 | 97 | 63 |
| Methyl Acrylate (wt %) | — | 2 | — | 3 | — |
| N-Phenylmaleimide (wt %) | 12 | 13 | — | — | 25 |
| Styrene (wt %) | 6 | 5 | 15 | — | 12 |
| Maleic Anhydride (wt %) | — | — | 8 | — | — |
| Weight Average Molecular Weight (Mw) | 120000 | 130000 | 120000 | 100000 | 130000 |

TABLE 2

| | | Examples | | | | | | Comparative Examples | |
|---|---|---|---|---|---|---|---|---|---|
| | | 1 | 2 | 3 | 4 | 5 | 6 | 1 | 2 |
| Graft Copolymer | A-1 | 15.0 | | 15.0 | 3.0 | 18.0 | 3.0 | 3.0 | |
| | A-2 | | 15.0 | | 3.0 | | 3.0 | | |
| | A-3 | | | | | | | | 15.0 |
| | A-4 | | | | | | | | |
| Mass Average Particle Size of Rubber Component Unit | μm | 0.25 | 0.32 | 0.25 | 0.29 | 0.25 | 0.29 | 0.25 | 0.32 |
| ontent of Unsaturated Nitrile Monomer in Graft | mass % | 20.0 | 27.0 | 20.0 | 23.5 | 20.0 | 23.5 | 20.0 | 30.0 |
| Vinyl-based Copolymer | B-1 | 5.0 | 5.0 | 5.0 | 1.0 | 6.5 | 1.0 | 1.0 | |
| | B-2 | | | | 1.0 | | 1.0 | | |
| | B-3 | | | | | | | | 5.0 |

TABLE 2-continued

|  |  |  |  |  |  |  |  |  |  |
|---|---|---|---|---|---|---|---|---|---|
|  | B-4 |  |  |  |  |  |  |  |  |
|  | B-5 |  | 15.0 | 15.0 |  |  |  |  |  |
|  | B-6 |  | 5.0 | 5.0 | 30.0 | 32.0 | 19.0 | 21.5 | 36.0 | 10.0 |
|  | B-7 |  |  |  |  |  |  |  |  | 10.0 |
| Methacrylic-based Copolymer | M-1 |  | 60.0 | 60.0 |  | 60.0 | 55.0 |  | 60.0 | 60.0 |
|  | M-2 |  |  |  | 50.0 |  |  | 70.5 |  |  |
|  | M-3 |  |  |  |  |  |  |  |  |  |
|  | M-4 |  |  |  |  |  |  |  |  |  |
|  | M-5 |  |  |  |  |  |  |  |  |  |
| Coloring Agent | X-1 |  | 0.5 | 0.5 | 0.5 | 0.5 | 0.5 | 0.5 | 0.5 | 0.5 |
| Acetone Insoluble Fraction (A) | mass % | 15.0 | 15.0 | 15.0 | 6.0 | 18.0 | 6.0 | 3.0 | 15.0 |
| Acetone Soluble Fraction (B) | mass % | 85.0 | 85.0 | 85.0 | 94.0 | 82.0 | 94.0 | 97.0 | 85.0 |
| Ratio of Methacrylate Monomer (in Acetone Soluble Fraction) | mass % | 57.9 | 57.9 | 47.1 | 52.3 | 55.0 | 60.0 | 50.7 | 57.9 |
| Ratio of Maleimide-based Monomer Unit in 100 mass % of Thermoplastic Resin Composition | mass % | 7.2 | 7.2 | 6.5 | 7.2 | 6.6 | 9.2 | 7.2 | 7.2 |
| Vicat Softening Point | °C. | 119 | 119 | 115 | 119 | 117 | 121 | 119 | 119 |
| Charpy Impact | J/m2 | 9 | 10 | 10 | 4 | 12 | 4 | 1 | 8 |
| Brightness (L*) | — | 5.9 | 5.9 | 6.2 | 5.7 | 6.4 | 6.2 | 5.7 | 6.5 |
| Appearance Properties/Silver streaks | — | ○ | ○ | ○ | ○ | ○ | ○ | ○ | ○ |
| Appearance Properties/White Haze | — | ○ | ○ | ○ | ○ | ○ | ○ | ○ | X |
| Mass decrease ratio | % | 0.8 | 0.8 | 0.8 | 0.8 | 0.7 | 0.9 | 0.8 | 0.8 |
| Pencil Hardness | — | F | F | F | H | HB | H | H | F |

|  |  |  | Comparative Examples |  |  |  |  |
|---|---|---|---|---|---|---|---|
|  |  |  | 3 | 4 | 5 | 6 | 7 |
| Graft Copolymer | A-1 |  |  | 25.5 | 15.0 | 15.0 | 15.0 |
|  | A-2 |  |  |  |  |  |  |
|  | A-3 |  |  |  |  |  |  |
|  | A-4 |  | 15.0 |  |  |  |  |
| Mass Average Particle Size of Rubber Component Unit | μm | 0.37 | 0.25 | 0.25 | 0.25 | 0.25 |
| ontent of Unsaturated Nitrile Monomer in Graft | mass % | 25.0 | 20.0 | 20.0 | 20.0 | 20.0 |
| Vinyl-based Copolymer | B-1 |  |  | 8.5 | 5.0 | 5.0 | 5.0 |
|  | B-2 |  |  |  |  |  |  |
|  | B-3 |  |  |  |  |  |  |
|  | B-4 |  | 5.0 |  |  |  |  |
|  | B-5 |  |  |  | 15.0 | 15.0 |  |
|  | B-6 |  | 10.0 | 16.0 | 5.0 | 5.0 | 30.0 |
|  | B-7 |  | 10.0 |  |  |  |  |
| Methacrylic-based Copolymer | M-1 |  | 60.0 | 50.0 |  |  |  |
|  | M-2 |  |  |  |  |  |  |
|  | M-3 |  |  |  | 60.0 |  |  |
|  | M-4 |  |  |  |  | 60.0 |  |
|  | M-5 |  |  |  |  |  | 50.0 |
| Coloring Agent | X-1 |  | 0.5 | 0.5 | 0.5 | 0.5 | 0.5 |
| Acetone Insoluble Fraction (A) | mass % | 15.0 | 25.5 | 15.0 | 15.0 | 15.0 |
| Acetone Soluble Fraction (B) | mass % | 85.0 | 74.5 | 85.0 | 85.0 | 85.0 |
| Ratio of Methacrylate Monomer (in Acetone Soluble Fraction) | mass % | 57.9 | 55.0 | 54.4 | 68.5 | 37.0 |
| Ratio of Maleimide-based Monomer Unit in 100 mass % of Thermoplastic Resin Composition | mass % | 7.2 | 6.0 | 0.0 | 0.0 | 12.5 |
| Vicat Softening Point | °C. | 119 | 114 | 119 | 101 | 125 |
| Charpy Impact | J/m2 | 8 | 12 | 8 | 8 | 8 |
| Brightness (L*) | — | 6.6 | 6.7 | 6.1 | 5.7 | 6.7 |
| Appearance Properties/Silver streaks | — | ○ | ○ | X | ○ | ○ |
| Appearance Properties/White Haze | — | X | X | X | ○ | ○ |
| Mass decrease ratio | % | 0.7 | 0.7 | 3.4 | 0.6 | 0.7 |
| Pencil Hardness | — | F | B | F | F | B |

The description given so far reveals that a thermoplastic resin composition of the present invention provides an injection molded product that exhibits jet-blackness, scratch resistance, heat resistance and impact resistance and has stable and beautiful appearance free from silver streaks and white haze.

This application is based upon the prior Japanese patent application (Japanese Patent Application No. 2013-233402) filed on Nov. 11, 2013 with the Japan Patent Office, the entire contents of which are incorporated herein by reference.

INDUSTRIAL APPLICABILITY

Since automotive interior parts of the present invention exhibits jet-blackness, scratch resistance and heat resistance, has stable and beautiful appearance free from silver streaks and white haze, and is excellent in impact resistance, it does not require coating, decoration or the like, and is excellent in surface appearances, and therefore, is economically and environmentally useful.

The invention claimed is:

1. An automotive interior part, comprising a thermoplastic resin composition comprising an acetone insoluble fraction (A) and an acetone soluble fraction (B),
   wherein a content of the acetone insoluble fraction (A) is 5 to 18% by mass based on 100% by mass of a sum of the acetone insoluble fraction (A) and the acetone soluble fraction (B),
   the acetone insoluble fraction (A) comprises one, two or more resins having different constitutional units, the constitutional units of all the resins comprised in the acetone insoluble fraction (A) comprise at least a rubber component unit having a mass average particle size of 0.1 to 0.35 μm, an aromatic vinyl monomer unit and an unsaturated nitrile monomer unit,
   the acetone insoluble fraction (A) comprises a graft copolymer in which at least the unsaturated nitrile monomer unit is grafted onto the rubber component unit,
   a content of the unsaturated nitrile monomer unit comprised in the graft copolymer is 15 to 28% by mass based on 100% by mass of all grafted constitutional units,
   the acetone soluble fraction (B) comprises one, two or more resins having different constitutional units, and the constitutional units of all the resins comprised in the acetone soluble fraction (B) comprise at least an aromatic vinyl monomer unit, an unsaturated nitrile monomer unit, a methacrylate monomer unit and a maleimide-based monomer unit, and
   a content of the methacrylate monomer unit is 45 to 60% by mass based on 100% by mass of the constitutional units of all the resins comprised in the acetone soluble fraction (B).

2. The automotive interior part according to claim 1, wherein a Vicat softening point according to ISO 306 of the thermoplastic resin composition is 105 to 120° C.

3. The automotive interior part according to claim 1, wherein a content of the maleimide-based monomer unit is 5 to 13% by mass based on 100% by mass of the thermoplastic resin composition.

4. The automotive interior part according to claim 1, wherein the rubber component unit comprises a diene-based rubber unit.

5. The automotive interior part according to claim 1, wherein a content of the rubber component unit is 30 to 60% by mass based on 100% by mass of the constitutional units of all the resins comprised in the acetone insoluble fraction (A).

* * * * *